United States Patent [19]

Hassel et al.

[11] Patent Number: 5,061,756

[45] Date of Patent: Oct. 29, 1991

[54] PROCESS FOR THE PREPARATION OF POLYURETHANE POWDERS

[75] Inventors: Tillmann Hassel, Cologne; Hanns P. Müller, Bergisch Gladbach; Hugo Vernaleken, Krefeld; Helmut Kipphardt, Hamburg; Rolf Dhein, Krefeld, all of Fed. Rep. of Germany

[73] Assignee: Bayer Aktiengesellschaft, Leverkusen, Fed. Rep. of Germany

[21] Appl. No.: 566,017

[22] Filed: Aug. 10, 1990

[30] Foreign Application Priority Data

Aug. 25, 1989 [DE] Fed. Rep. of Germany ....... 3928149

[51] Int. Cl.$^5$ .............................................. C08L 75/04
[52] U.S. Cl. .................................... 525/127; 525/131
[58] Field of Search ................................ 525/127, 131

[56] References Cited

U.S. PATENT DOCUMENTS 3,787,525  1/1974  McGarr ............................. 260/859
3,894,994  7/1975  Day et al. ........................ 260/75 NE
3,933,759  1/1976  Hoeschele .................... 260/77.5 TB
4,000,218 12/1976  Critchfield et al. ................ 260/858
4,032,516  6/1977  McGarr ....................... 260/77.5 AA
4,107,256  8/1978  Conrad et al. ...................... 264/310
4,873,289 10/1989  Lindner et al. ..................... 525/293

FOREIGN PATENT DOCUMENTS 1486224  9/1977  United Kingdom .

Primary Examiner—Maurice J. Welsh
Attorney, Agent, or Firm—Joseph C. Gil; Richard E. L. Henderson

[57] ABSTRACT

The present invention is directed to an improved process for the direct preparation of polyurethane powders in a finely divided form by the reaction of polyisocyanates and isocyanate reactive compounds in a carrier phase, using interface active compounds, the improvement wherein the interface active compound used consists of at least one polymer of a urethane of (i) a long chain alkyl isocyanate and (ii) a hydroxyalkyl-acrylic or -metacrylic acid ester.

10 Claims, No Drawings

PROCESS FOR THE PREPARATION OF POLYURETHANE POWDERS

BACKGROUND OF THE INVENTION

The present invention relates to a process for the direct preparation of polyurethane powders from the components in an organic carrier phase.

Polyurethane powders and their technical use are known. The powders are generally prepared by a difficult process of grinding the corresponding granulate. The direct synthesis of the powders from their components in an organic carrier phase by the method of suspension polymerization is a simpler process, with the best results being obtained when the carrier phase consists of aliphatic and/or alicyclic hydrocarbons. Interface active auxiliary substances are essential for carrying out this direct synthesis. The auxiliary substances have the function of converting the reaction components into finely divided emulsions and keeping the resulting polyurethane in emulsion or suspension until the end of the reaction.

In German Auslegeschrift 2,816,170, special polyoxyalkylene-polydimethylsiloxane graft or block copolymers are proposed as interface active auxiliary substances for the direct synthesis of polyurethane powders from aliphatic hydrocarbons in a carrier phase. Polymers containing polydimethylsiloxane are, however, generally not suitable for polyurethane applications since they tend to produce surface defects in the molded products and give rise to difficulties in lacquering. Extreme care must be taken to remove these auxiliary substances as far as possible quantitatively from the powder. In German Auslegeschrift 2,456,927, block and graft copolymers of polylactones and long chain alkyl esters of (meth)acrylic acid and corresponding products obtained from polyoxyalkylene glycols and long chain alkyl esters of (meth)acrylic acid are described as interface active auxiliary substances for the direct preparation of polyurethane powders by the method of suspension polymerization in an aliphatic carrier phase of hydrocarbons. These auxiliary substances have the disadvantage of being OH functional and therefore incorporated in the polyurethane produced so that changes in the mechanical properties of the products may occur and the auxiliary substances cannot be reused.

In German Auslegeschriften 2,556,945, 2,559,769 and 2,442,085 and in U.S. Pat. Nos. 4,032,516 and 3,787,525, copolymers of N-vinylpyrrolidone and long chain α-olefins are used as interface active auxiliary substances for the direct synthesis of polyurethane powders in a hydrocarbon carrier phase.

These auxiliary substances cannot be built into the end product but are difficult to desorb from the surface of the powders produced, with the result that elaborate washing operations are necessary for recovering the auxiliary substances.

It was an object of the present invention to provide an improved process for the direct preparation of polyurethane powders which would result in finely divided polyurethane dispersions and in which the emulsifiers could easily be removed after formation of the powders.

DESCRIPTION OF THE INVENTION

The present invention relates to a process for the direct preparation of polyurethane powders in a finely divided form by the reaction of polyisocyanates and isocyanate reactive compounds in a carrier phase with the aid of interface active compounds, characterized in that the interface active compound used consists of at least one polymer of a urethane of (i) a long chain alkyl isocyanate and (ii) a hydroxyalkyl(meth)acrylic acid ester.

In a particularly preferred embodiment, the interface active polymer is obtainable by the polymerization of a compound corresponding to the following formula

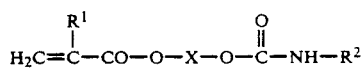

wherein
$R^1$ represents H or $CH_3$,
X represents a straight chain or branched aliphatic alkyl group having 2 to 10, preferably 2 to 4 carbon atoms, and
$R^2$ represents a straight chain or branched aliphatic alkyl group having 6 to 30, preferably 10 to 20, and most preferably 18 carbon atoms.

In a particularly preferred embodiment, the compounds used as component (ii) are mono(meth)acrylic acid esters of optionally branched aliphatic $C_2$ to $C_{10}$-diols, preferably $C_2$ and $C_4$-diols, and the isocyanate component (i) used consists of optionally branched aliphatic $C_6$ to $C_{30}$-monoisocyanates, preferably $C_{10}$ to $C_{20}$-monoisocyanates, and most preferably $C_{18}$-monoisocyanates.

Although the polymers to be used according to the invention are already known from German Auslegeschrift 2,456,737, and U.S. Pat. No.-A-4,058,508, they have not hitherto been used as auxiliary substances for the direct synthesis of polyurethane powders in a hydrocarbon carrier phase.

In a preferred embodiment, the polymers to be used according to the invention consist entirely of polymerized urethanes of (i) a long chained alkylisocyanate and (ii) a hydroxyalkyl(meth)acrylic acid ester in particular corresponding to the general formula noted above.

The following are examples of suitable hydroxyalkylesters (ii) for the preparation of these urethanes: acrylic acid-2-hydroxyethylester; acrylic acid-2-hydroxy-propylester; acrylic acid-4-hydroxybutylester; acrylic acid-6-hydroxyhexylester; and, preferably, the corresponding methacrylic acid esters. The alcohol component of these hydroxyalkylesters given as examples is derived from optionally branched aliphatic $C_2$ to $C_{10}$-diols. The hydroxyalkylesters preferably used are methacrylic acid-2-hydroxyethylester and methacrylic acid-4-hydroxybutylester in which the alcohol component is derived from $C_2$ and $C_4$-diols.

Suitable monoisocyanates (i) for the preparation of these urethanes are derived from optionally branched aliphatic monoamines in which the carbon chain has from 6 to 30, preferably from 10 to 20, and most preferably 18 carbon atoms.

The following are specific examples of such isocyanates: 2-ethyl-hexylisocyanate; decylisocyanate; dodecylisocyanate; tetradecylisocyanate; hexadecylisocyanate; stearylisocyanate; eicosylisocyanate; and tetraeicosylisocyanate. Isocyanates such as decylisocyanate, palmitylisocyanate, myristylisocyanate and stearylisocyanate are preferred. These isocyanates may be used as mixtures.

Preferred polymers are obtainable from (i) mono(meth)acrylic acid esters of optionally branched aliphatic $C_2$ to $C_{10}$-diols, preferably $C_2$ and $C_4$-diols, and (ii) optionally branched aliphatic $C_6$ to $C_{30}$-monoisocyanates, preferably $C_{10}$ to $C_{20}$-monoisocyanates, most preferably $C_{18}$-monoisocyanates.

The polymerization of such urethanes is known (see, e.g., German Auslegeschrift 2,456,737 and Japanese patent 14 805/64). The polymerization may be carried out by the methods conventionally used for acrylates, which have been exhaustively described in Houben-Weyl: Methoden der organischen Chemie, Volume E 20, pages 1141 to 1176, Thieme Stuttgart 1987.

If the polymers are added to the system, they enable polyurethane powders to be prepared directly according to the invention from polyisocyanates, macropolyols, macropolyamines, chain lengthening agents and optionally chain regulators and other auxiliary substances and additives in an aliphatic and/or alicyclic hydrocarbon carrier phase.

In a preferred embodiment, the invention relates to a process for the direct preparation of polyurethane powders from polyisocyanates, macropolyols, chain lengthening agents, optionally chain regulators and optionally other auxiliary agents and additives in an aliphatic and/or alicyclic hydrocarbon carrier phase, characterized in that the synthesis is carried out in the presence of from 0.05 to 10%, preferably from 0.5 to 5%, most preferably from 1 to 3% of the polymers noted above based on the total weight of the polyurethane to be produced.

The polyisocyanates used for this process may in principle be any known aromatic, alicyclic or aliphatic polyisocyanates but the synthesis of linear products is carried out mainly with diisocyanates of the formula $Q(NCO)_2$ in which Q stands for an aromatic hydrocarbon group having 6 to 15 carbon atoms or for an aliphatic hydrocarbon group, a cycloaliphatic hydrocarbon group or a mixed aliphatic/cycloaliphatic hydrocarbon group having 2 to 15 carbon atoms. The following are examples of such diisocyanates: tolylene diisocyanate, naphthylene diisocyanate, diphenylmethane diisocyanate, hexamethylene diisocyanate, isophorone diisocyanate, cyclohexane-1,4-diisocyanate and perhydrodiphenylmethane diisocyanate. These isocyanates may also be used as mixtures.

The macropolyols suitable for this process are the known substances conventionally used in polyurethane chemistry. They are compounds generally having molecular weights of from 400 to 10,000 and containing on average at least 1.8 isocyanate reactive hydrogen atoms. They include compounds containing hydroxyl groups, in particular from 2 to 8 hydroxyl groups, and especially compounds of this type having molecular weights of from 450 to 6000, preferably from 600 to 4500. Such materials include polyesters, polyethers, polythioethers, polylactones, polycarbonates, polyester carbonates, polyether carbonates, polyacetals and polyester amides containing at least 2, generally from 2 to 8, preferably 2 to 4 hydroxyl groups. For the purpose of the present invention, it is particularly advantageous to use macropolyols having an OH functionality of 2 for the preparation of the polyurethanes. Linear products are thereby obtained.

Macropolyamines may also be used as macromolecular compounds, especially macrodiamines. Such macropolyamines may be prepared, for example, from polyether polyols by direct reaction with ammonia as described in German Auslegeschrift 1,215,373. The macropolyols may also be converted into isocyanate prepolymers by a reaction with diisocyanates, preferably aromatic diisocyanates, and these prepolymers may then be hydrolyzed to form amino-terminated compounds.

It is particularly preferred, however, to use macropolyols.

The chain lengthening agents used may suitably be the short chain alcohols, amines or amino alcohols conventionally used in polyurethane chemistry, which are generally isocyanate-difunctional. Examples of such compounds include alcohols such as ethylene glycol, 1,4-butanediol, 1,6-hexanediol, neopentyl glycol, hydroquinone-bis-2-hydroxyethylether, 1,4-cyclohexanediol diethylene glycol and 4,4'-dihydroxydicyclohexylmethane; amines such as ethylenediamine N,N'-dimethyl-ethylenediamine, 1,6-diaminohexane, isophorone diamine, 4,4-diaminodicyclohexylmethane N,N',N"-trimethyldiethylenetriamine, piperazine and aminoethylpiperazine. Ethanolamine and N-2-hydroxyethylpiperazine are examples of suitable amino alcohols.

Chain regulators are optionally used in the manner known in the art for regulating the molecular weight of the polyurethane powders which can be prepared directly according to the invention. These chain regulators may be monofunctional isocyanates, alcohols and/or amines such as, for example, butylisocyanate, phenylisocyanate, ethanol, isopropanol, decanol, dibutylamine, hexylamine or morpholine.

The auxiliary agents and additives used may be catalysts of the kind known in the art for use in polyurethane chemistry, such as tin-II octoate, dibutyl tin dilaurate, titanium tetrabutylate, iron-II-acetyl acetonate, diazabicyclooctane and N,N-tetramethylethylene diamine. Further examples of additives include fillers and reinforcing materials such as glass fibers, carbon fibers, titanium dioxide, diatomaceous earth, aromatic polyamides, liquid crystalline polyesters, optionally as milled products, quartz powder and polyureas as well as dyes and inorganic or organic pigments. Additives of this type are insoluble in the hydrocarbon phase and are preferably incorporated in the macropolyols before the direct polyurethane powder synthesis is carried out.

The carrier phase used for the process according to the invention preferably consists of hydrocarbons whose boiling points or boiling ranges are preferably equal to the desired reaction temperature. Hydrocarbons having boiling points from 40° C. to 200° C. may therefore be used, preferably those boiling within the range of from 60° C. to 150° C. but it is particularly advantageous to use carrier phases boiling in the range of from 80° C. to 120° C. because the polyurethane powders can then easily be separated and rapidly dried. The hydrocarbons may be used as pure substances or as mixtures. Petroleum hydrocarbon fractions boiling within the above-mentioned ranges and free from aromatic compounds are the most economical.

When polyurethane powders are prepared in a hydrocarbon carrier phase according to the invention, the powders are obtained in the form of sedimenting suspensions from which the products may be separated, for example by filtration. The solids content of these suspensions may vary, for example from 10 to 60%. Higher solids contents are preferable for the sake of high volume/time yields but powder synthesis is easier to carry out at solids contents of up to 50%. Solids contents of from 20 to 50% and especially from 30 to 40% are most preferred.

The synthesis according to the invention is preferably carried out at temperatures from 40° C. to a maximum of 140° C., more preferably at 50° C. to 100° C., the optimum reaction temperatures being from 60° C. to 80° C.

Solvent-free synthesis of polyurethanes may in principle be carried out by various processes. All the components could be mixed together and then reacted (the one-shot process) or a prepolymer may first be prepared from the macropolyol and the polyisocyanate, and this prepolymer may then be reacted with the chain lengthening agent in a second reaction stage (prepolymer method). It is known that for a given overall composition, polyurethanes produced by these methods differ in their application technical properties according to the method of synthesis employed. For the purpose of this invention, both methods or variations thereof are suitable for the direct preparation of polyurethane powders in a hydrocarbon carrier phase. For example, the macropolyol and the chain lengthening agent may be emulsified in the carrier phase and the required quantity of polyisocyanate may then be added. Alternatively, the polyisocyanate and emulsifier may be introduced into the reaction vessel together with the carrier phase, and the macropolyol mixed with chain lengthening agent may then be added. In one variation of this one-shot process which is particularly preferred for the purpose of this invention, the carrier phase containing the polyisocyanate and interface active auxiliary substance is introduced into the reaction vessel, the system is heated to boiling and the macropolyol and chain lengthening agent, optionally mixed together, are added dropwise to the boiling mixture. This is a simple method for achieving temperature control. The desired reaction temperature may be obtained by suitable choice of the carrier phase.

On the other hand, the macropolyol and polyisocyanate may be reacted solvent-free to form the prepolymer and the prepolymer may then be emulsified in the carrier phase with the aid of the interface active substances according to the invention and the resulting emulsion may be reacted with chain lengthening agents as described above.

Finally, the prepolymer process may be carried out by adding the isocyanate prepolymer to the carrier phase containing chain lengthening agent and auxiliary substances according to the invention.

Since the homopolymers used according to the invention and the corresponding monomers are ready soluble in the carrier phase, the auxiliary substance could be produced in situ in the carrier phase before powder synthesis is carried out by the process variations described above.

The invention is further illustrated but is not intended to be limited by the following examples in which all parts and percentages are by weight unless otherwise specified.

EXAMPLES

Example 1

Homopolymer 212.5 g of the urethane obtained from the dibutyltin-dilaurate-catalyzed reaction of equimolar amounts of 2-hydroxyethyl methacrylate and stearyl-isocyanate in toluene are dissolved in 650 g of toluene together with 0.06 g of dibenzoyl peroxide. The solution obtained is added dropwise to 100 ml of toluene under reflux within 2 hours with stirring. Polymerization is carried out under $N_2$. The reaction mixture is then stirred under reflux for 12 hours and the solvent is distilled off in a high vacuum at 80° C. The residue which solidifies to a waxy product is used for powder syntheses.
Yield: quantitative.

Example 2

3.3 g of the product of Example 1 are introduced into 118.5 g of ligroin boiling in the region of 90° C. 50 g of a dehydrated butanediol-adipic acid polyester having a molecular weight of 2250 (hydroxyl functionality of 2) and 5 g of 1,4.butanediol are added at 65° C. with vigorous stirring using a paddle stirrer (1200 revs/min). 20 g of solid 4,4'-diisocyanato-diphenylmethane and about 0.1 g of dibutyl tin dilaurate are then added. The temperature initially falls slightly and then rises briefly to 90° C. The reaction mixture is stirred at 65° C. until the carrier phase is free from NCO (2 hours) and the reaction mixture is cooled. The solid substance is separated off and dried in air.

A free flowing powder is obtained.
Yield: 70 g
Sieve analysis: $400\mu < 4.37\%$ $>200\mu < 60.93\%$ $>160\mu < 18.39\%$ $>125\mu < 13.52\%$ $>80\mu < 2.78\%$ $>0\mu$ The data of sieve analysis are the proportions by weight of powder unable to fall through the indicated standard sieve according to DIN 4188 after one hour's shaking in a mechanical shaker.

Example 3

The experiment described in Example 2 was repeated but in this case with 2.2 g of the product of Example 1. 68 g of a free flowing powder having a particle size of $<400\mu$ were obtained.
Sieve analysis: $400\mu < 22.4\%$ $>200\mu < 51.76\%$ $>160\mu < 19.95\%$ $>b\ 125\mu < 5.26\%$ $>80\mu < 0.61\%$ $>0\mu$.

Example 4

Recycling of the mother liquor

The carrier phase from Example 3 obtained by suction filtration without washing is used as carrier phase to repeat Example 3 after it has been made up to the initial weight. The difference in this case is that no new auxiliary substance is added.

69 g of a free-flowing powder providing the following sieve analytical data are obtained:
$400\mu < 16.58\%$ $>200\mu < 29.02\%$ $>160\mu < 32.1\%$ $>125\mu < 15.2\%$ $>80\mu < 7.1\%$ $>0\mu$.

Example 5

(Comparison Example)

Example 3 is repeated but with the addition of 2.2 g of an N-vinyl-pyrrolidone-hexadecane copolymer of average molecular weight 7300 (Antaron (R) V 216 of GAF) as auxiliary substance. After termination of the reaction, the carrier phase is separated from the powder by sharp suction filtration. The powder is not washed. The mother liquor obtained is reused as carrier phase after it has been made up to the initial weight and the experiment is repeated without the addition of new auxiliary substance. No powder is obtained. Instead, the polyurethane precipitates as lumps.

This Example shows that N-vinylpyrrolidone-hexadecene copolymer is not readily desorbed from the polyurethane matrix.

Example 6

110 g of 4,4'-diisocyanato-diphenylmethane and 13.2 g of the product of Example 1 in 537 g of ligroin are introduced into a 2 liter reaction vessel equipped with anchor blade stirrer, dropping funnel and reflux condenser. The reaction mixture is heated to reflux (92.C) and 2 g of dibutyl tin dilaurate are added. A hot mixture (100.C) of 100 g of polytetrahydrofuran (OH number 112, F =2), 100 g of polytetrahydrofuran (OH number 56, F =2), 26 g of 1,4-butanediol and 1.4 g of carnauba wax is then added within 25 minutes with stirring (250 revs/min). The mixture is stirred for a further hour under reflux and cooled to room temperature with stirring, and the powder is then separated by suction filtration and dried.
Yield: 320 g
Sieve analysis: 400µ<54.45% >200µ<42.61% >160µ<2.51% >125µ<0.4% >80µ.

Example 7

A mixture of 25 g of polytetrahydrofuran (M =1000, OH number =112) and 25 g of polytetrahydrofuran (M =2000, OH number=56) is reacted with 27.5 g of 4,4'-diisocyanatodiphenylmethane to form the isocyanate prepolymer. This prepolymer is added dropwise at a temperature of 90° C. to a boiling (92° C.), rapidly stirred (1300 revs/min) mixture of 6.5 g of 1,4-butanediol, 3.3 g of the product of Example 1, 0.1 g of dibutyl tin dilaurate and 133 g of ligroin within 30 minutes. The mixture is then stirred under reflux for one hour and cooled to room temperature. The powder obtained is separated by suction filtration and dried.
Yield: 79 g
Sieve analysis: 400µ<72.38% >200µ<27.32% >160µ<0.3% >125µ.

Example 8

13.2 g of hexamethylene diisocyanate, 3.96 g of the product of Example 1 and 0.5 ml of dibutyl tin dilaurate in 310 g of ligroin are introduced into a round bottomed flask equipped with paddle stirrer, reflux condenser and dropping funnel. A hot mixture (100° C.) of 48 g of butanediol polyadipate (F =2, OH number =49.8), 12 g of hexanediol/ neopentyl glycol polyadipate (F =2, OH number =56) and 4.8 g of 1,4-butanediol is added dropwise within 18 minutes under reflux (92° C.) with stirring (1300 revs/min). Stirring is continued at a high speed under reflux for 2 hours and then slowly at 70° C. for 8 hours. The powder is then separated by suction filtration after cooling.
Yield: 70 g
Sieve analysis: 400µ<24.75% >200µ<53.29% >160µ<18.96% >125µ<2.4% >80µ<0.6% >0µ.

Example 9

(Comparison Example)

The experiment of Example 8 is repeated but in this case the auxiliary substance used in that Example is replaced by 3.96 g of the auxiliary substance from Example 5. Lumps formed as soon as the polyol mixture began to be added but the reaction mixture remained stirrable. Stirring was continued as in Example 8. The product was isolated by suction filtration after cooling. It was not obtained in the form of a powder but as irregularly formed lumps with cross-sections of up to 2 cm.

Example 10

86.2 g of diphenylmethane diisocyanate and 8.9 g of the product of Example 1 in 900 ml of ligroin were introduced into a 2 liter reaction beaker equipped with anchor blade stirrer, dropping funnel and reflux condenser. The reaction mixture was heated to reflux (92° C.) and 700 mg of n-octanol and 200 mg of dibutyl tin dilaurate were added. A hot mixture (100° C.) of 76.5 g of a butanediol polyadipate (M =2,250, F =2), 13.5 g of a hexanediol polyadipate (M =2,000, F =2) and 28.35 g of 1,4-butanediol was then added dropwise within 20 minutes with stirring (250 revs/min).

Stirring was continued under reflux for 3 hours and the reaction mixture was then cooled and the powder was separated by suction filtration.
Yield: 200 g
Sieve analysis: 400µ<23.98% >200µ<10.98% >160µ<8.94% >125µ<11.59% >80µ<44.51% >0µ.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the direct preparation of polyurethane powders in a finely divided form by the reaction of polyisocyanates and isocyanate reactive compounds in a carrier phase, using interface active compounds, the improvement wherein the interface active compound used consists of at least one polymer of a urethane of (i) a long chain alkyl isocyanate and (ii) a hydroxyalkyl-acrylic or -methacrylic acid ester.

2. The process of claim 1 wherein the polymer is obtainable by the polymerization of at least one compound corresponding to the formula

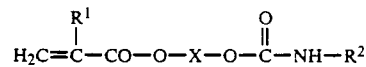

wherein
R$^1$ represents H or CH$_3$,
X represents a straight chain or branched aliphatic alkyl group having from 2 to 10 carbon atoms and
R$^2$ represents a straight chain or branched aliphatic alkyl group having from 6 to 30 carbon atoms.

3. The process of claim 1 wherein component (ii) is a monoacrylic acid or monomethacrylic acid ester of a straight or branched aliphatic C$_2$ to C$_{10}$-diol and component (i) is a straight or branched aliphatic C$_6$ to C$_{30}$-monoisocyanate.

4. The process of claim 1 wherein component (i) is an isocyanate having 18 carbon atoms in the carbon chain and component (ii) is a monoacrylic or monomethacrylic acid ester of a C$_2$ to C$_4$-diol.

5. The process of claim 1 wherein the carrier phase used is a hydrocarbon and wherein the reaction is carried out in the presence of from 0.05 to 10 % by weight of said polymer, based on the total weight of the polyurethane to be prepared.

6. The process of claim 1 wherein the carrier phase consists of aliphatic and/or alicyclic, optionally branched hydrocarbons or hydrocarbon mixtures boiling at temperatures from 40° C. to 200° C.

7. The process of claim 1 wherein the reaction is carried out at temperatures from 40° C. to 140° C.

8. The process of claim 1 wherein the proportion of the sum of polyurethane components in the total weight including the carrier phase is from 10 to 60%.

9. The process of claim 1 wherein synthesis of the polyurethane powders is carried out by the one-shot method.

10. The process of claim 1 wherein synthesis of the polyurethane powders is carried out by the prepolymer method.

* * * * *